June 24, 1930.  F. L. SCOTT  1,765,545

ROLLER WELL DRILL

Filed June 27, 1927

Floyd L. Scott  Inventor

By Jesse R. Stone

Attorney

Patented June 24, 1930

1,765,545

UNITED STATES PATENT OFFICE

FLOYD L. SCOTT, OF HOUSTON, TEXAS, ASSIGNOR TO HUGHES TOOL COMPANY, OF HOUSTON, TEXAS, A CORPORATION OF TEXAS

ROLLER WELL DRILL

Application filed June 27, 1927. Serial No. 201,610.

My invention relates to well drills for use in drilling deep wells for water, oil, gas and the like.

It is an object of the invention to provide a roller drill in which the cutters are supported so as to be quickly assembled and again easily removed when desired. I desire also to provide a drill of the cross roller type in which the cross roller shaft is curved to position the cutters so as to cut a dish shaped bottom of the hole and thus serve to center the drill and also enable it to run smoothly. I aim to provide a cross roller shaft upon which the cutters may be assembled in the shop and which can be then secured to the drill head with a minimum of manipulation.

Figure 1:
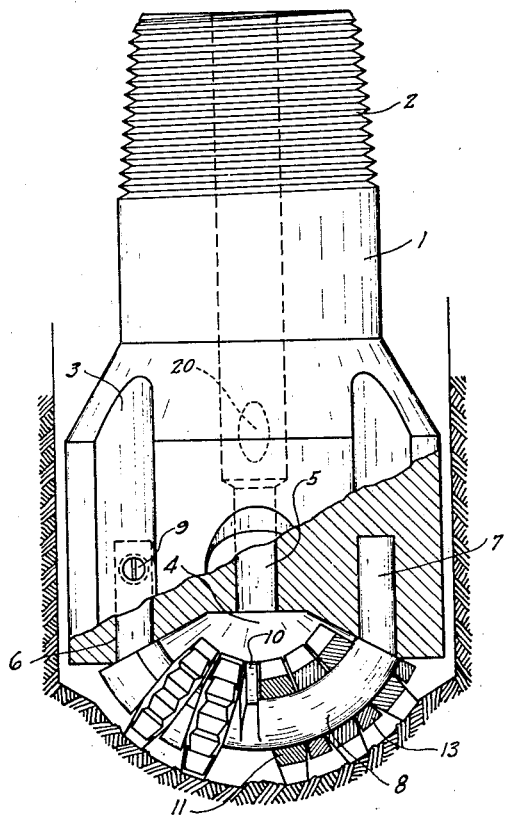
Figure 2:
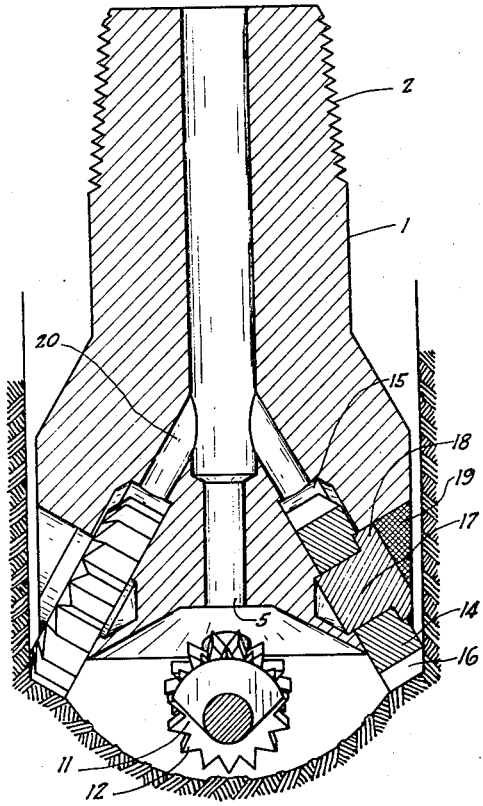

Referring to the drawings herewith, Fig. 1 is a side view of a drill head embodying my invention, certain parts being broken away in central section. Fig. 2 is a central vertical section of the drill taken in a position at right angles to the view shown in Fig. 1.

The drill has a solid head with a cylindrical shank 1, the upper end of which is tapered and threaded at 2 for attachment to a drill collar.

The lower portion of the head is enlarged in diameter and is fluted at 3 to allow passage of fluid. The lower face of the head is formed with a bowl-shaped recess 4 into which a central fluid passage 5 discharges.

At each side of the central axis are the upwardly extending recesses 6 shaped to receive the ends 7 of a curved shaft 8. The shaft is approximately U-shaped the ends extending into the head and secured therein by means of set screws 9 or other equivalent means.

The shaft 8 has an intermediate boss 10 thereon, slightly off center and serving to position the cutters at each side thereof. The cutters 11 are toothed at 12 to engage at the bottom of the hole. The cutters are approximately disc shaped and are spaced apart on their outer sides by blocks 13 of steel welded to the shaft after the cutters are assembled thereon. As shown in Fig. 1 there are two cutters shown at one side and three on the other, it being desired to position the cutters at unequal distances from the central axis so that they will not cut in the same tracks on the bottom of the hole. By thus off-setting the cutters on one side relative to those on the other side, the full bottom of the hole will be cut effectively.

Clearance for the drill is cut by two side cutters 14 set in pockets 15 in the base of the head, said pockets being formed at each side of the cross shaft 8 and inclined upwardly and inwardly toward the central axis of the head. The cutters are disc-shaped toothed on their peripheries, and beveled slightly at 16 to engage the sidewall of the hole. The cutters are mounted on shafts 17 set into the head from the outside, the head 18 of the shaft acting to retain the cutter thereon. The shafts are retained in position by a bond 19 of material, welded into the recess behind the head of the shaft as shown.

It will be noted that the side cutters 14 cut clearance for the drill at the wall of the hole. The cross roller cutters cut the central portion of the well bottom and serve to center and steady the drill. The water is delivered through the central channel 5 upon the cutters 11 and through branching channels 20 upon the side cutters 14, thus clearing the cutters of material disintegrated in the operation of the drill.

The advantages of the construction lie in the simplicity of the drill, and its ease of assembly. The side shafts 17 may be easily removed by the use of a blow torch and the cross shaft requires only the removal of the set screws 9 to enable the shaft and cutters to be removed.

What I claim as new is:

1. A drill head having a pair of shaft-receiving recesses in the forward end thereof, a U-shaped shaft, the ends of which are secured in said recesses, cutters on said shaft, and a pair of side cutters set in separate recesses in said head to cut the side wall of the hole.

2. A drill head having a pair of shaft-receiving recesses in the forward end thereof, a U-shaped shaft with its ends secured in said recesses, disc-shaped cutters on said shaft and means to hold said cutters apart, and a side cutter at each side of said shaft, said side cutters being inclined outwardly at their lower ends to bear against the side wall of the hole.

3. A drill head having a pair of shaft-receiving recesses in the forward end thereof, a U-shaped shaft with is ends secured in said recesses, disc-shaped cutters on said shaft so mounted relative to each other as to cut separate tracks on the bottom of the hole and a pair of opposite side cutters spaced at each side of said shaft.

4. A drill of the cross roller type including a head, two inclined side cutters mounted at opposite sides of the forward end of said head, a cross roller shaft of U-shape, having its upper ends secured in vertical recesses in said head, and disc shaped cutters on said cross roller shaft.

In testimony whereof, I hereunto affix my signature, this the 17th day of June A. D. 1927.

FLOYD L. SCOTT.